(12) United States Patent
Xu et al.

(10) Patent No.: US 11,365,499 B2
(45) Date of Patent: Jun. 21, 2022

(54) METHOD FOR STORING WASHING MACHINE IDENTIFICATION CODE IN TAG MEMORY

(71) Applicant: QINGDAO HAIER WASHING MACHINE CO., LTD., Shandong (CN)

(72) Inventors: Sheng Xu, Shandong (CN); Hai Shu, Shandong (CN); Yang Li, Shandong (CN); Junming Yin, Shandong (CN); Zhenxing Huang, Shandong (CN); Tao Zhang, Shandong (CN)

(73) Assignee: QINGDAO HAIER WASHING MACHINE CO., LTD., Shandong (CN)

( * ) Notice: Subject to any disclaimer, the term of this patent is extended or adjusted under 35 U.S.C. 154(b) by 376 days.

(21) Appl. No.: 16/618,543

(22) PCT Filed: Jun. 1, 2018

(86) PCT No.: PCT/CN2018/089443
§ 371 (c)(1),
(2) Date: Mar. 13, 2020

(87) PCT Pub. No.: WO2018/219339
PCT Pub. Date: Dec. 6, 2018

(65) Prior Publication Data
US 2020/0277722 A1 Sep. 3, 2020

(30) Foreign Application Priority Data
Jun. 1, 2017 (CN) .......................... 201710404557.5

(51) Int. Cl.
*D06F 34/28* (2020.01)
*D06F 34/05* (2020.01)
(Continued)

(52) U.S. Cl.
CPC .............. *D06F 34/28* (2020.02); *D06F 34/05* (2020.02); *D06F 34/18* (2020.02);
(Continued)

(58) Field of Classification Search
CPC ....................................................... D06F 34/28
See application file for complete search history.

(56) References Cited

FOREIGN PATENT DOCUMENTS

| CN | 102339399 A | 2/2012 |
| CN | 102383286 A | 3/2012 |

(Continued)

OTHER PUBLICATIONS

International Search Report (PCT/ISA/210) dated Sep. 10, 2018, by the State Intellectual Property Office of the P.R. China as the International Searching Authority for International Application No. PCT/CN2018/089443.
(Continued)

*Primary Examiner* — Jason Y Ko
(74) *Attorney, Agent, or Firm* — Buchanan Ingersoll & Rooney PC

(57) ABSTRACT

The present disclosure discloses a method for storing a washing machine identification code in a tag memory, the washing machine identification code being for indicating fabric information, the tag memory including an EPC memory for storing an electronic product code for identifying a tag object and a USER memory for storing user-defined data. The method includes: detecting a storage space remained of the EPC memory of the tag memory; storing the washing machine identification code into the EPC memory if the storage space is enough to store the washing machine identification code; otherwise, storing the washing machine identification code into the USER memory. Meanwhile, different writing priorities are used for different types of fabric attribute information in the storage process, thus
(Continued)

Storage structure of washing machine identification code ensuring that the electronic tag memory can completely and effectively store the key information of fabric attributes and meeting the requirement of smart washing of the washing machine.

12 Claims, 2 Drawing Sheets

(51) Int. Cl.
    *D06F 34/18*     (2020.01)
    *G06K 19/07*     (2006.01)
    *D06F 101/06*     (2020.01)
    *D06F 101/20*     (2020.01)

(52) U.S. Cl.
    CPC ...... *G06K 19/0723* (2013.01); *D06F 2101/06* (2020.02); *D06F 2101/20* (2020.02)

(56) References Cited

FOREIGN PATENT DOCUMENTS

| CN | 202584166 U | 12/2012 |
|---|---|---|
| CN | 103042998 A | 4/2013 |

OTHER PUBLICATIONS

Written Opinion (PCT/ISA/237) dated Sep. 10, 2018, by the State Intellectual Property Office of the P.R. China as the International Searching Authority for International Application No. PCT/CN2018/089443.

METHOD FOR STORING WASHING MACHINE IDENTIFICATION CODE IN TAG MEMORY

TECHNICAL FIELD

The present disclosure belongs to the field of electronic tags, and particularly relates to a method for storing a washing machine identification code in a tag memory.

BACKGROUND

Radio Frequency Identification (RFID) is a non-contact automatic identification technology, mainly utilizes the transmission characteristics of radio frequency signals and spatial convergence (inductive or electromagnetic coupling) and can automatically identify target objects and obtain relevant data. The most distinctive feature of RFID is that: by using radio waves to transmit and identify information so as to realize wireless two-way communication, data reading amount is large, remote reading can be realized, space limitation is avoided, and object tracking and data exchange can be achieved quickly. As a new wireless identification technology, compared with the traditional bar code, IC card, voice recognition and biometric identification methods, RFID is rapidly developing and widely used in various fields worldwide due to its significant advantages.

An RFID system developed from RFID technology usually includes an electronic tag, a reader-writer and antennae (reader-writer antenna, electronic tag antenna) for realizing data communication between the electronic tag and the reader-writer, and electronic data in a certain format are stored in the electronic tag as the identification information of an object to be identified. In application, the electronic tag is attached to the object to be identified and used as the electronic mark of the object to be identified. The reader-writer sends commands to the electronic tag. The electronic tag transmits the stored identification data to the reader-writer according to the received reader-writer instructions to further realize data communication. The reader-writer reads and decodes the data, and then transmits the data to a computer host or a network for relevant data processing.

With the upgrading of washing machines and technology development, smart washing technology using electronic tags has made great progress.

In an earlier patent, a smart washing method of a washing machine based on wireless automatic identification technology is disclosed, in which clothes attached with smart tags, a smart tag reading device, a smart information processing device of the washing machine, a washing machine operation display interface (touch display screen) and a user are included. The patent identifies clothes information based on wireless automatic identification technology to realize the extension of customized functions in the washing procedure: (1) the smart tag reading device set or connected by the washing machine can identify clothes information; (2) personalized customization of the washing procedure is realized; (3) automatic identification of clothes information and personalized design of the washing procedure are realized, the washing effect is optimized and the smartness of the washing machine is improved. The patent also proposes the idea of establishing a household laundry information database by connecting a washing machine to a network and uploading data.

In another patent, a method for a washing machine to automatically identify clothes is disclosed. By adding a near-field communication module to identify an electronic tag on the clothes and judge whether the clothes can be washed together with other clothes, redundant dyeing induction units can be omitted, washing machine components can be reduced, and the cost can be reduced; besides, the cost of the near-field communication module is low, which can further reduce the cost of the washing machine.

At present, Electronic Product Code (EPC) Class-1 Generation-2 (abbreviated as G-2) has been widely used. Under this protocol, an electronic tag memory is divided into four independent storage banks which are respectively a RESERVED storage area, an EPC storage area, a tag identifier (TID) storage area and a USER storage area. The RESERVED storage area is used for managing the kill password and access password of the electronic tag. The TID area generally stores the information provided by an electronic tag chip manufacturer, the EPC area generally stores the electronic product code, i.e. the identification information, and the USER area stores business data, which needs to be defined by a user according to the application.

In order to truly realize smart washing, the smart washing machine and the electronic tag need to be combined together, that is, the electronic tag on the clothes needs to be able to clearly indicate various attribute information of the clothes. At the same time, due to the different influences of the attribute information on washing conditions, the storage space of each area of the electronic tag and the priority when the attribute information is written into the corresponding memory need to be fully considered when the electronic tag is entered.

In view of this, the present disclosure is proposed.

SUMMARY

The technical problem to be solved by the present disclosure is to overcome the defects of the prior art and disclose a method for storing a washing machine identification code in a tag memory. The tag memory includes an EPC memory for storing an electronic product code for identifying a tag object and a USER memory for storing user-defined data, and the washing machine identification code is a code for indicating fabric information. The method includes: detecting a storage space remained of the EPC memory of the tag memory; storing the washing machine identification code into the EPC memory when the storage space is enough to store the washing machine identification code; otherwise, storing the washing machine identification code into the USER memory. Meanwhile, different writing priorities are used for different types of fabric attribute information in the storage process, thus ensuring that the electronic tag memory can completely and effectively store the key information of fabric attributes and meeting the requirement of smart washing of the washing machine.

In order to achieve the purpose, the technical solution of the present disclosure is as follows.

A method for storing a washing machine identification code in a tag memory is provided, the washing machine identification code is a code for identifying fabric information, and the tag memory includes an EPC memory for storing an electronic product code for identifying a tag object and a USER memory for storing user-defined data.

The method includes: detecting a storage space remained of the EPC memory of the tag memory; storing the washing machine identification code into the EPC memory if the storage space is enough to store the washing machine identification code; otherwise, storing the washing machine identification code into the USER memory if the storage space remained of the EPC memory is not enough.

Further, the fabric information indicated by the washing machine identification code includes fabric attribute information, and priorities in the process of writing different fabric attribute information into the tag memory are different.

Further, the fabric attribute information includes fabric material information, fabric color information, fabric category information, fabric specification information and fabric manufacturer information;

and the priority order of writing the fabric attribute information into the memory is: fabric material information>fabric color information>fabric category information>fabric specification information>fabric manufacturer information.

Further, the method and the tag memory conform to the EPC Class1 Gen2 protocol.

Further, a encoding length of the washing machine identification code is 4-45 bits, and each of the fabric attribute information is written into the tag memory in order from high to low;

preferably, the encoding length is 32 bits.

Further, a storage space of the tag memory is divided into different storage areas according to fabric attribute information, and sizes of storage areas occupied by various fabric attribute information are not completely the same;

preferably, the relationship of sizes of storage areas occupied by various fabric attribute information is as following: fabric manufacturer information>fabric category information>fabric color information≥fabric specification information>fabric material information.

Further, in the tag memory, the fabric manufacturer information occupies 12 bits, the fabric specification information occupies 5 bits, the fabric category information occupies 6 bits, the fabric color information occupies 5 bits, and the fabric material information occupies 4 bits.

Further, the tag memory further stores a fabric factory internal code defined by a fabric manufacturer, and the fabric factory internal code is written into the tag memory with the washing machine identification code.

Further, the priority of writing the fabric factory internal code into the tag memory is lower than the priority of the washing machine identification code.

Further, the washing machine identification code cannot be modified after being written into the tag memory.

After the technical solution is adopted, compared with the prior art, the present disclosure has the following beneficial effects:

According to the method for storing the washing machine identification code in the tag memory disclosed by the present disclosure, during the storage of the washing machine identification code, the storage space remained of the EPC memory of the tag memory is detected first; if the storage space is enough to store the washing machine identification code, the washing machine identification code is stored into the EPC memory; otherwise, the washing machine identification code is stored into the USER memory. By adopting the method, it is ensured that the washing machine identification code information is an integral code, which provides a foundation for accurately reading the information expressed by each digit in the washing machine identification code.

The fabric information indicated by the washing machine identification code includes fabric attribute information, and different types of fabric attribute information have different writing priorities in the process of writing into the memory. It is ensured that the attribute information which has the greatest impact on the fabric washing process, such as fabric material information, fabric color information and fabric category information is preferentially entered, and the storage safety of key information is ensured. Meanwhile, according to the requirements of the amount of information expressed by the fabric attribute information, different capacities are planned for storage spaces, for storing different fabric attributes, in the memory, so that the limited storage space of the memory can be effectively utilized, and it is ensured that storage data will not overflow in relevant areas. Besides, the method is applicable to the fabric factory internal code defined by the fabric manufacturer and written together with the washing machine identification code. When the tag information of the fabric is stored in the electronic tag memory, the integrity of data is ensured, and the entry safety of key information is also ensured.

Specific embodiments of the present disclosure will be described in further detail in conjunction with the accompanying drawings below.

BRIEF DESCRIPTION OF THE DRAWINGS

As a part of the present disclosure, the accompanying drawings are used to provide a further understanding of the present disclosure. The illustrative embodiments of the present disclosure and the description thereof are used to explain the present disclosure, but do not constitute an improper limitation of the present disclosure. Obviously, the drawings in the following description are only some embodiments. For those skilled in the art, other drawings can be obtained according to these drawings without creative labor. In the drawings.

Figure 1:
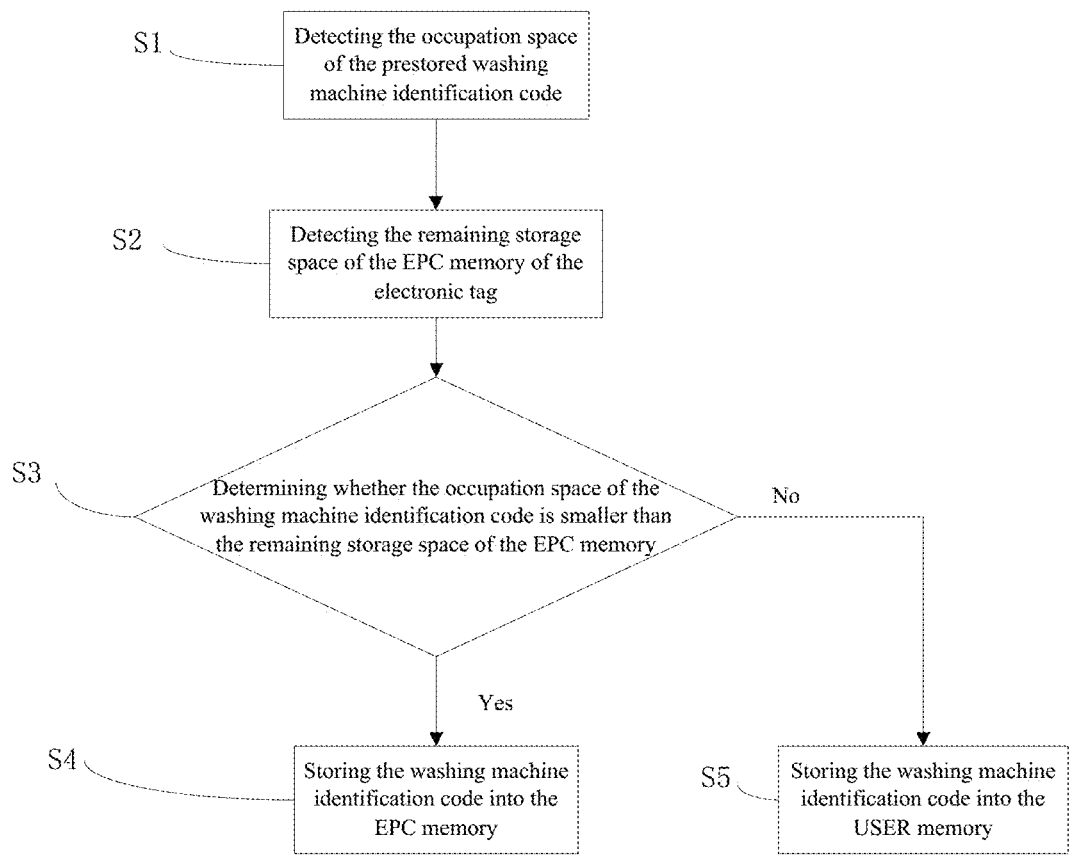
FIG. 1 is the storage steps of a method for storing a washing machine identification code in a tag memory according to the present disclosure.

It should be noted that the drawings and the written description are not intended to limit the scope of the inventive concept in any form, but to explain the inventive concept to those skilled in the art by referring to specific embodiments.

DETAILED DESCRIPTION

In order to make the purpose, technical solution and advantages of the embodiments of the present disclosure clearer, the technical solution in the embodiments will be clearly and completely described below in conjunction with the drawings in the embodiments of the present disclosure. The following embodiments are used to illustrate the present disclosure, but are not used to limit the scope of the present disclosure.

In the description of the present disclosure, it should be noted that the orientation or position relationship indicated by the terms "upper", "lower", "front", "rear", "left", "right", "vertical", "inner" and "outer" are based on the orientation or position relationship shown in the drawings, only for convenience of describing the present disclosure and simplifying the description, and do not indicate or imply that the indicated device or element must have a specific orientation, or be constructed and operate in a specific orientation, and therefore cannot be understood as a limitation of the present disclosure.

In the description of the present disclosure, it should be noted that the terms "install" and "connect" should be understood in a broad sense unless otherwise specified and defined. For example, it can be fixed connection, detachable connection or integrated connection; it can be mechanical connection or electrical connection; and it can be direct connection or indirect connection through intermediate media. For those of ordinary skill in the art, the specific meaning of the above terms in the present disclosure can be understood in specific situations.

Figure 2:
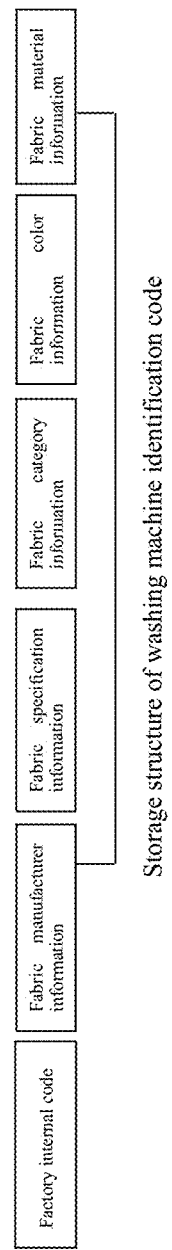
FIG. 2 is a storage structure of the washing machine identification code in the tag memory according to the present disclosure.

As shown in FIG. 1 to FIG. 2, the present disclosure discloses a method for storing a washing machine identification code in a tag memory, the tag memory includes an EPC memory for storing an electronic product code for identifying a tag object and a USER memory for storing user-defined data, and the washing machine identification code is a code for indicating fabric information.

The method for storing a washing machine identification code in a tag memory includes:

detecting the storage space remained of the EPC memory of an electronic tag; storing the washing machine identification code into the EPC memory if the storage space is enough to store the washing machine identification code; otherwise, storing the washing machine identification code into the USER memory if the storage space is not enough. Meanwhile, different writing priorities are used for different types of fabric attribute information in the storage process, thus ensuring that the electronic tag memory can completely and effectively store the key information of fabric attributes and meeting the requirement of smart washing of the washing machine.

Embodiment 1

FIG. 1 to FIG. 2 show a method for storing a washing machine identification code in a tag memory according to the present disclosure.

The fabric information indicated by the washing machine identification code in the present embodiment includes fabric attribute information, and the fabric attributes in the present embodiment include fabric material information, fabric color information, fabric category information, fabric specification information, fabric manufacturer information and the like.

According to the RFID-based electronic tag storage technology of the present embodiment, the storage method and the tag memory conform to the EPC Class1 Gen2 protocol. Under this protocol, an electronic tag memory is divided into four independent memories, which are respectively a RESERVED memory, an EPC memory, a tag identifier (TID) memory and a USER memory. The RESERVED memory is used for managing the kill password and access password of the electronic tag. The TID memory generally stores the information provided by an electronic tag chip manufacturer, the EPC memory generally stores the electronic product code, i.e. the identification information, and the USER memory stores business data, which needs to be defined by a user according to the application.

In order to ensure the storage integrity of the washing machine identification code, the storage method of the present disclosure is shown in FIG. 1 and includes the following steps:

S1, detecting the occupation space of the prestored washing machine identification code;

S2, detecting the storage space remained of the EPC memory of the electronic tag;

S3, determining whether the occupation space of the washing machine identification code is smaller than the storage space remained of the EPC memory; proceeding to S4 if the occupation space of the washing machine identification code is smaller than the remaining storage space of the EPC memory; otherwise, proceeding to S5;

S4, storing the washing machine identification code into the EPC memory; and

S5, storing the washing machine identification code into the USER memory.

In the method, before the washing machine identification code is stored, the encoding length of the prestored washing machine identification code is scanned by a scanning unit, the storage space required by the washing machine identification code is calculated, and the storage position of the washing machine identification code is determined according to the remaining space information fed back through scanning of the memory space. Under normal circumstances, the washing machine identification code is preferentially stored into the EPC memory, but when the storage space required by the washing machine identification code is found to be larger than the remaining space of the EPC memory after the above-mentioned operation steps, the identification code is integrally stored into the USER area.

When being written into the corresponding storage areas, different types of fabric attribute information indicated by the washing machine identification code have different writing priorities in the process of writing into the memory. Taking the fabric attributes in the present embodiment as an example, the priority order of writing into the memory is: fabric material information>fabric color information>fabric category information>fabric specification information>fabric manufacturer information.

In order to realize this priority, as shown in FIG. 2, the storage areas of the fabric attributes corresponding to the tag memory in this method are consistent with the encoding distribution of the washing machine identification code. The fabric material information which has the greatest influence on fabric washing is first stored into the memory, then the fabric color information, and so on. In this way, it is ensured that in the case of failed writing and storage failure due to unexpected conditions or storage overflow, the key data with the highest priority which is first written in is well stored, thus ensuring the fabric washing effect to the greatest extent.

In the present disclosure, the encoding length of the washing machine identification code is 4-45 bits, and each of the fabric attribute information is sequentially written into the memory from high to low. Specifically, in the present embodiment, the encoding length of the washing machine identification code is 32 bits. The tag memory is divided into different storage areas according to fabric attribute information, and the capacities of storage areas occupied by various fabric attribute information in the different storage areas are not completely the same;

in the present embodiment, the relationship of capacities of storage areas occupied by various fabric attribute information is as following: fabric manufacturer information>fabric category information>fabric color information≥fabric specification information>fabric material information.

In the present embodiment, the specific encoding space distribution under the storage structure rule in the tag memory of FIG. 2 is as follows:

the fabric manufacturer information occupies 12 bits, the fabric specification information occupies 5 bits, the fabric category information occupies 6 bits, the fabric color information occupies 5 bits, and the fabric material information occupies 4 bits.

It should also be noted that as shown in FIG. 2, the tag memory usually also stores the fabric factory internal code defined by the fabric manufacturer. Therefore, in addition to storing the washing machine identification code, the memory also needs to store the fabric factory internal code, which has no substantial significance for clothes washing. As a result, in the process of storing the fabric identification code, the priority of the fabric factory internal code is lower than the priority of the washing machine identification code, and no substantial influence is generated on the whole storage process of the washing machine.

In the embodiment, codes for indicating fabric information such as the washing machine identification code cannot be modified after being written into the tag memory.

Embodiment 2

The present embodiment is a supplement to Embodiment 1. The present embodiment provides a method for storing data for indicating fabric information, which includes: dividing the fabric information into N types of data information according to information types, and storing the N types of data information on a data carrier in the form of codes respectively, different codes in the same type of data information represent different pieces of defined specific fabric information.

In the above solution, the fabric information is divided into N types and stored on the data carrier in the form of codes respectively, which is conducive to standardizing the storage mode of the fabric information, thus any fabric can be stored and defined. The method is simple and practical, and is worth popularizing. On the other hand, storing the data information in the form of codes saves the storage capacity of the fabric information. Compared with the existing storage mode, the solution stores more fabric information using a smaller storage space.

Preferably, according to the category number of each type of data information in the N type of data information, appropriate bit numbers are allocated to each type of data information to store corresponding information.

In the above solution, the corresponding information is stored by allocating appropriate bit numbers to each type of data information according to the category number of each type of data information in the N type of data information. The design is reasonable and further saves the storage space. For example, clothes have material information and manufacturer information, and the existing material category number of clothes is far less than the number of manufacturers, so during storage space allocation, it is reasonable to allocate a larger storage space for manufacturer information than material information. Of course, the storage space allocated to each type of data information can be larger than the total category number of the existing type of data information, and there is still room for storage, so as to be compatible with the development of information in the field in the future. For example, if the existing material category number is M, the code which can be stored in the storage space allocated to material data has more than M variations, so that all the existing fabric material information can be completely represented in the storage space, and there may be more new fabric materials in the future, so the storage space can have a surplus.

On the other hand, the solution is not limited to the fact that the storage space allocated to each type of data information must be larger than the existing category number of the type of data information. And each type of data may be further divided into a plurality of sub-categories according to certain rules, so that the storage capacity of the storage space allocated to each type of data information only needs to be sufficient to distinguish the plurality of sub-categories.

For example, the fabric material information includes jute, ramie, sheep's wool, rabbit hair, silk, spider silk, polyester, nylon, acrylic, etc., thus the materials can be classified as hemp material (jute, ramie), wool material (sheep's wool, rabbit hair), silk material (silk, spider silk), chemical fiber material (polyester, nylon, acrylic), and then the fabric material information can be allocated with two bits, for example, 00 represents hemp material, 01 represents wool material, 10 represents silk material, and 11 represents chemical fiber material (this example is for explanation only and is not used to limit the technology of the present disclosure).

Preferably, the N types of data information include fabric material information, fabric color information, and fabric category information, wherein the number of bits occupied by the fabric category information>the number of bits occupied by the fabric color information>the number of bits occupied by the fabric material information.

In the above solution, the fabric material information, the fabric color information and the fabric category information that are included in the N types of data information are the most important three types of data information of fabrics summarized by the inventors through a large number of experiments, and can basically meet the conventional requirements. These three types of data are very important fabric attribute information. The fabric material information is an important basis for consumers to select fabrics, and is also an important reference basis for selecting detergents to wash fabrics, for example, the fabric material information can be used for realizing smart matching of washing programs, can also meet the needs of people to select fabrics, and is also a basis for fabric recycling and classification. The color of fabrics is an important basis for consumers to choose fabrics, and is also an important reference basis to decide whether different fabrics can be washed together; in modern automation industry, this data information is important parameter information. The fabric attribute information is not only an important basis for detergent selection, but also an important basis for washing strength, is also a basis for people to select fabrics, and is also important parameter information in future or present automatic design. Therefore, the fabric material information, the fabric color information and the fabric category information are three important types of data in the N types of data information of fabrics, are basically the most commonly needed information for industrial automation, and also meet the requirement of people for learning about fabric information. These three types of data information together can even be said to be an objective indicator of fabric performance.

Preferably, the fabric material information occupies 3-6 bits, the fabric color information occupies 4-6 bits, and the fabric category information occupies 5-7 bits. More preferably, the fabric material information occupies 4 bits, the fabric color information occupies 5 bits, and the fabric category information occupies 6 bits.

In the above solution, the design that the fabric material information occupies 4 bits, the fabric color information occupies 5 bits, and the fabric category information occupies 6 bits is the optimal storage mode summarized by the inventors through a great deal of research. By designing the specific storage bit numbers, the fabric attribute information of fabrics can be basically distinguished, and the requirements of conventional classification can be met. For example, the fabric material information can be stored or indicated by 4 bits to distinguish 16 materials, which are cotton, hemp, mulberry silk, tencel, real silk, silk, sheep's wool, cashmere, polypropylene, acrylic, spandex, viscose, nylon, polyester, chemical fiber and polyester fiber. These classifications fully meet the needs of people for detailed classification of fabric materials, can be used as a basis for washing machines to select matching fabric washing programs and detergents, and can also be used as a basis for people to properly predict fabrics.

Embodiment 3

The present embodiment is a supplement to the data carrier which uses the data storage method of the above embodiment for data storage. The data carrier of the present embodiment includes:

a first storage area, configured to store fabric attribute information;

and the first storage area includes a fabric material information storage module configured to store fabric material information.

In the above solution, the fabric material information is the most important information of fabrics, and is related to various automatic control fields of related fabrics, such as the field of fabric classification and recycling, the field of fabric washing program matching, the field of fabric function analysis, the field of smart pricing of fabrics, etc.

Preferably, the first storage area further includes a fabric color information storage module and a fabric category information storage module.

The fabric color information storage module is configured to store corresponding fabric color information, and the fabric category information storage module is configured to store corresponding fabric category information.

Preferably, the first storage area further includes a manufacturer information storage module and a fabric specification information storage module, wherein the manufacturer information storage module is configured to store fabric manufacturer information, and the fabric specification information storage module is configured to store fabric specification information.

In the above solution, specification data is a basis for fabric sorting, can be used as an important basis for smart sorting of fabrics and is also an important basis for fabric recycling. The manufacturer information can be used in the fields of fabric counterfeiting prevention and fabric evaluation.

Preferably, the fabric material information, the fabric color information, the fabric category information, the fabric specification information and the fabric manufacturer information are all codes, and different types of defined specific information are represented by different codes.

In the above solution, the representation of the fabric material information, the fabric color information, the fabric category information, the fabric specification information, and the fabric manufacturer information in the form of codes is beneficial to saving the storage space. The data carrier of the present disclosure is fixed on a corresponding fabric for indicating fabric information in one kind of application, and is a data carrier which will be used a lot. So the cost needs to be reduced as much as possible, and the cost can be directly reduced by reducing the storage space of the data carrier, thus the solution is the most practical low-cost solution.

Preferably, the capacity of the first storage area is M bytes, and the storage capacity of the manufacturer information storage module>the storage capacity of the fabric category information storage module>the storage capacity of the fabric color information storage module≥the storage capacity of the fabric specification information storage module>the storage capacity of the fabric material information storage module.

In the above solution, the storage capacities allocated to the storage modules are different because the category numbers of various types of information of fabrics are different. Meanwhile, allocating different storage capacities to the storage modules is also a way to save the storage space of the data carrier, so when the storage area of the data carrier is configured in the way that the storage capacity of the manufacturer information storage module>the storage capacity of the fabric category information storage module>the storage capacity of the fabric color information storage module≥the storage capacity of the fabric specification information storage module>the storage capacity of the fabric material information storage module, more fabric information can be stored.

Preferably, the M is 4, the fabric manufacturer information occupies 12 bits, the fabric specification information occupies 5 bits, the fabric category information occupies 6 bits, the fabric color information occupies 5 bits, and the fabric material information occupies 4 bits.

Preferably, the data carrier further includes a second storage area, and the second storage area is configured for fabric manufacturers to store manufacturer internal information.

In the above solution, the data carrier is provided with the second storage area, which facilitates fabric identification by manufacturers, and the second storage area also increases the dependence of manufacturers on the data carrier, thus being beneficial to the popularization and application of the data carrier at manufacturers. The design is more reasonable, combines the needs of manufacturers with the needs of the outside, and is conducive to the promotion of the data carrier.

The above description is only preferred embodiments of the present disclosure, and is not intended to limit the present disclosure in any form. Although the present disclosure has been disclosed in the preferred embodiments, it is not intended to limit the present disclosure. Any person familiar with this patent can make some changes or modifications to equivalent embodiments with equivalent changes by using the above-mentioned technical contents without departing from the scope of the technical solution of the present disclosure. However, any simple amendments, equivalent changes and modifications made to the above embodiments according to the technical essence of the present disclosure without departing from the contents of the technical solution of the present disclosure are still within the scope of the solution of the present disclosure.

The invention claimed is:

1. A method for storing a washing machine identification code in a tag memory, the washing machine identification code being for indicating fabric information, the tag memory including an EPC memory for storing an electronic product code for identifying a tag object and a USER memory for storing user-defined data, comprising:
   detecting a storage space remained of the EPC memory of the tag memory;
   storing the washing machine identification code into the EPC memory if the storage space is enough to store the washing machine identification code;
   storing the washing machine identification code into the USER memory if the storage space remained of the EPC memory is not enough to store the washing machine identification code.

2. The method according to claim 1, wherein the fabric information indicated by the washing machine identification code comprises fabric attribute information, and priorities in a process of writing different fabric attribute information into the tag memory are different.

3. The method according to claim 2, wherein the fabric attribute information comprises fabric material information, fabric color information, fabric category information, fabric specification information, and fabric manufacturer information; and a priority order of writing the fabric attribute information into the tag memory is: fabric material information>fabric color information>fabric category information>fabric specification information>fabric manufacturer information.

4. The method according to claim 1, wherein the method and the tag memory conform to the EPC Class1 Gen2 protocol.

5. The method according to claim 2, wherein an encoding length of the washing machine identification code is 4-45 bits, and the fabric attribute information is written into the tag memory in order from high bit to low bit.

6. The method according to claim 5, wherein the storage space of the tag memory is divided into different storage areas according to fabric attribute information, and capacities of storage areas occupied by various fabric attribute information are not completely same.

7. The method according to claim 6, wherein in the tag memory, the fabric manufacturer information occupies 12 bits, the fabric specification information occupies 5 bits, the fabric category information occupies 6 bits, the fabric color information occupies 5 bits, and the fabric material information occupies 4 bits.

8. The method according to claim 1, wherein the tag memory further stores a fabric factory internal code defined by a fabric manufacturer, and the fabric factory internal code is written into the tag memory with the washing machine identification code.

9. The method according to claim 8, wherein a priority of writing the fabric factory internal code into the tag memory is lower than a priority of writing the washing machine identification code into the tag memory.

10. The method according to claim 1, wherein the washing machine identification code is not be modified after being written into the tag memory.

11. The method according to claim 5, wherein the encoding length is 32 bits.

12. The method according to claim 6, wherein a relationship of capacities of storage areas occupied by various fabric attribute information is as following: fabric manufacturer information>fabric category information>fabric color information≥fabric specification information>fabric material information.

* * * * *